June 28, 1966
J. R. MULLEN
3,258,174
DISPENSERS FOR METERING EQUAL PREDETERMINED AMOUNTS
OF A FLOWABLE MATERIAL
Filed June 15, 1964
3 Sheets-Sheet 1
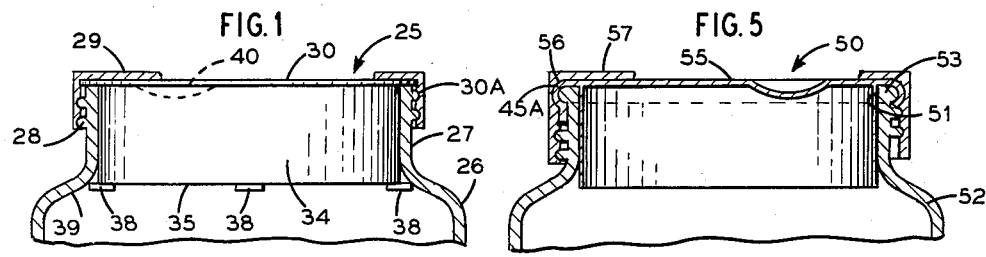
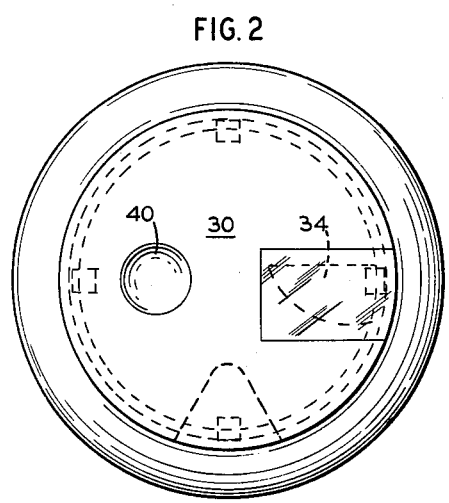
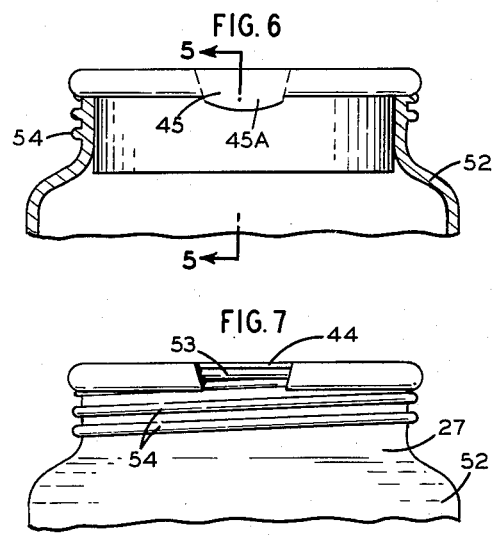
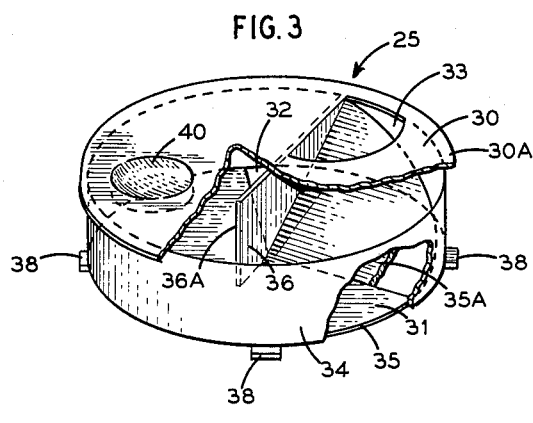
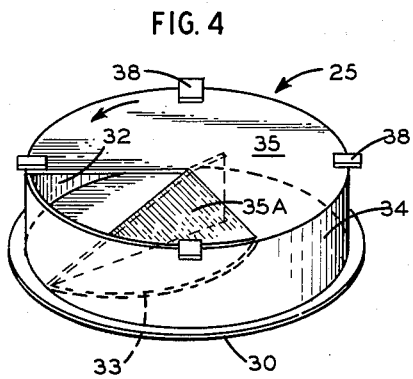
INVENTOR.
Jerry R. Mullen
BY
Arthur P. Fattibene
ATTORNEY

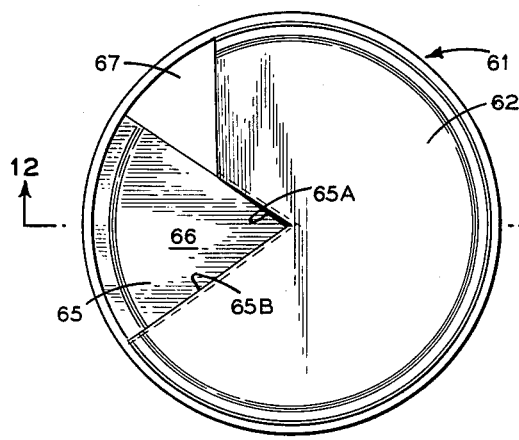
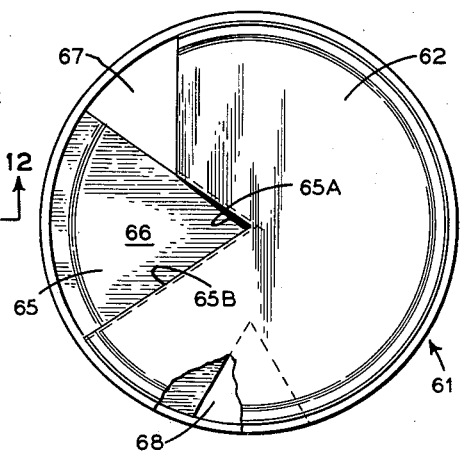
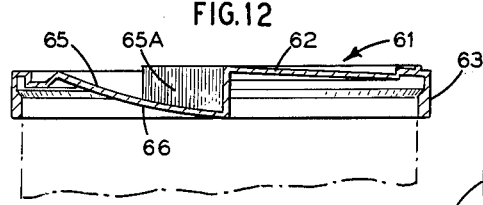
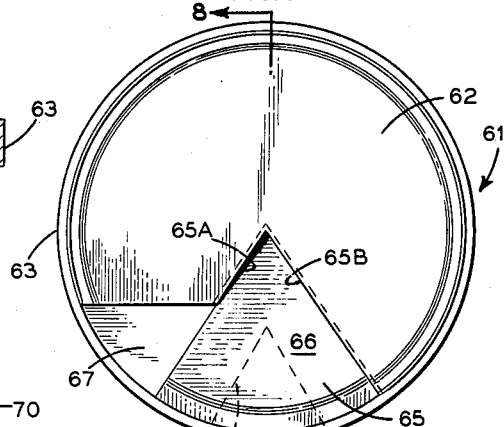
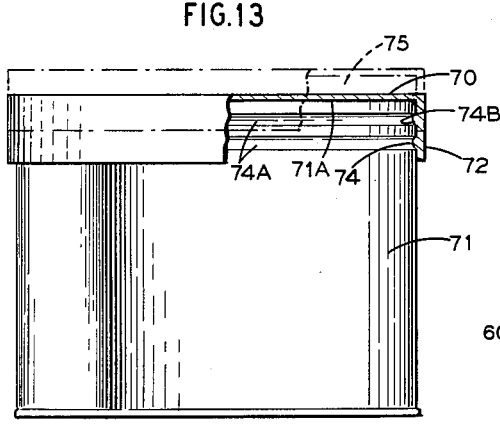
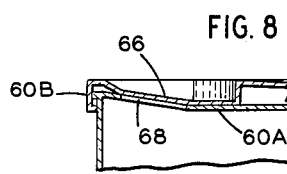

June 28, 1966 J. R. MULLEN 3,258,174
DISPENSERS FOR METERING EQUAL PREDETERMINED AMOUNTS
OF A FLOWABLE MATERIAL
Filed June 15, 1964 3 Sheets-Sheet 3
FIG. 17
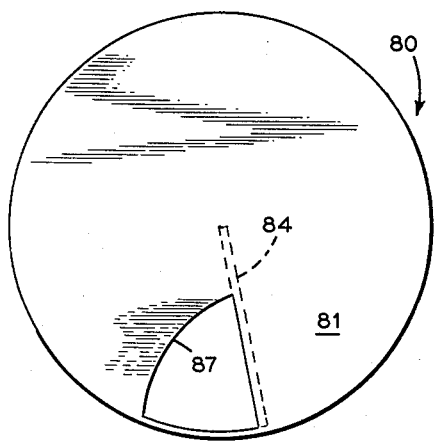
FIG. 18
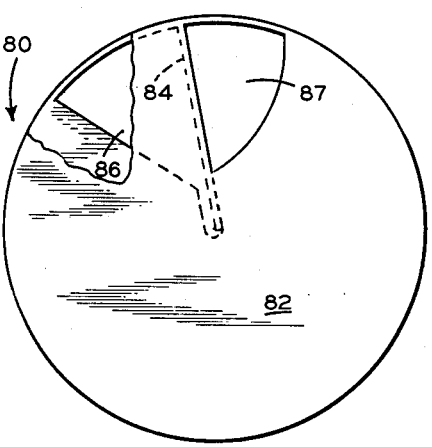
FIG. 14
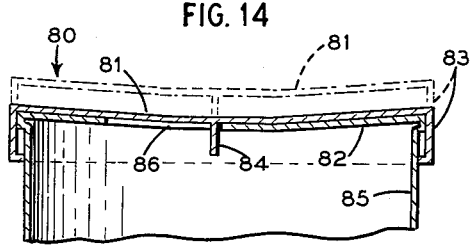
FIG. 16
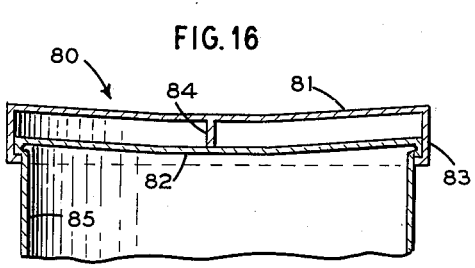
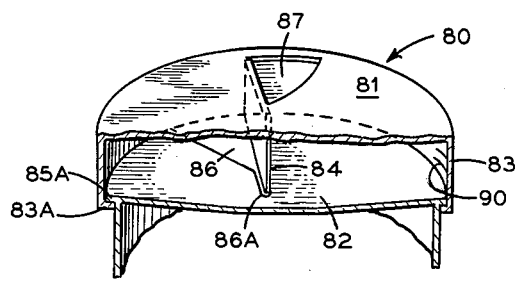
FIG. 15
INVENTOR
Jerry R. Mullen
BY
ATTORNEY

# United States Patent Office 3,258,174
Patented June 28, 1966

3,258,174
DISPENSERS FOR METERING EQUAL PREDETERMINED AMOUNTS OF A FLOWABLE MATERIAL
Jerry R. Mullen, Crestwood, N.Y., assignor of ten percent to Arthur T. Fattibene, Southport, Conn.
Filed June 15, 1964, Ser. No. 374,932
21 Claims. (Cl. 222—307)

This invention relates in general to an improved dispensing means for dispensing from a container such materials as readily flowable granulated or powdered materials and the like, and more specifically to dispensing means for dispensing substantially equal predetermined amounts of readily flowable granular or powdered material on each dispensing operation and constituting an improvement to dispensers of the type disclosed in my copending applications, Serial No. 106,410, filed April 28, 1961, now Patent 3,137,418 and of the type disclosed in U.S. Patents 2,190,092 and 2,657,836.

An object of this invention is to provide a dispenser adapted for use with a container for holding a supply of readily flowable powdered or granular material to facilitate the dispensing therefrom of equal predetermined amounts of the powdered material contained therein by tilting the container upon each dispensing operation and rotating the dispenser relative to the container.

Another object of this invention is to provide an improved dispenser in which a rotatable dispensing means is incorporated into the opened or mouth end of the container and which functions in response to rotation of the dispenser relative to the container when the container is tilted to dispensing position.

Still another object of the invention is to provide an improved dispensing top which is adapted to be detachably connected to the upper end of a container or can, and which in conjunction with the upper wall or end of the container defines therewith a dispensing means which in the tilted position of the container functions to dispense equal predetermined amounts of the material contained therein upon each dispensing operation.

Still another object of this invention provides an improved dispensing means adapted to be utilized in conjunction with a container whereby the equal predetermined amounts of granular material dispensed therefrom can be varied at will.

It is another object of this invention to provide in combination with screw cap containers an improved dispensing means incorporated in the opened end thereof for effecting the dispensing of substantially equal predetermined amounts of granular materials stored in such containers when tilted whereby the dispensing is effected by rotating the dispenser relative to the container.

Another object of this invention is to provide a container having a dispensing means incorporated therein wherein the material contained in the container is supplied thereto by gravity as the dispenser is manually rotated about a selected axis, and from which material received therein is delivered to a point of use outside the container by continued rotation of the dispenser relative to the container.

Another object of this invention is to provide a readily simplified dispensing means which can be readily adapted to a container for dispensing therefrom by gravity equal predetermined amounts of material upon each dispensing operation thereof.

Another object of this invention is to provide a relatively simple and inexpensive dispenser which can be economically fabricated by mass production, and which is rendered readily adapted for use with standard type containers and which will function to dispense substantially equal predetermined amounts of granular material upon each dispensing operation thereof.

Still another object is to provide an improved dispensing top for use in conjunction with a can type container for dispensing therefrom equal predetermined amounts of material thereby and whereby adjustment of the dispenser top relative to the container top functions to vary the quantity of said predetermined amounts.

The foregoing objects and other features and advantages of the invention will become more readily apparent when considered in view of the drawings in which, FIGURE 1 is a cross section view of a container incorporating the dispensing means of the instant invention as applied to the open mouth jar or container.

FIGURE 2 is a plan view of FIG. 1.

FIGURE 3 is a detail perspective view of the dispensing means of the instant invention having portions thereof broken away and shown in section.

FIGURE 4 is a perspective bottom view of the dispensing unit of FIG. 3.

FIGURE 5 is a cross sectional view of a modified form of the invention.

FIGURE 6 is a sectional end view of the modified form of the invention of FIG. 5 in which the opening of the dispenser is sealed.

FIGURE 7 is a view similar to that of FIG. 6 but illustrating the unsealed position of the dispenser.

FIGURE 8 is a sectional view of a modified form of the invention taken along line 8—8 of FIG. 9.

FIGURE 9 is a plan view of the dispenser of FIG. 8, and shown in the inoperative position thereof.

FIGURE 10 is a plan view similar to that of FIG. 9 but illustrating the dispenser top in ready position for dispensing when the container is tilted or inverted.

FIGURE 11 is a detail plan view of the dispensing top of the form disclosed in FIGS. 8 through 12.

FIGURE 12 is a sectional side view taken along line 12—12 of FIG. 11, and

FIGURE 13 illustrates a modified form of the invention of the type disclosed in FIGS. 8 through 12 inclusive.

FIGURE 14 is a fragmentary sectional view of still another modified form of the invention in which the solid line showing illustrates the inoperative position and the dash line showing the operative position thereof.

FIGURE 15 is a partial perspective view of the form disclosed in FIG. 14 shown in the operative position.

FIGURE 16 is a sectional view illustrating the manner in which the dispenser top is secured to the container before the container has been punctured for use.

FIGURE 17 is a detail plan view of the dispenser of FIGS. 14 to 16.

FIGURE 18 is a plan view of the dispenser shown of FIG. 14.

Referring to the drawings, there is shown in FIGS. 1 through 7 an improved dispensing means of the type disclosed in my copending patent application, Serial No. 106,410, now Patent No. 3,137,418 which is adapted to be applied to a full opened end container or jar 26 adapted to contain a readily flowable supply of granulated or powdered material. In the illustrated form, the jar or container 26 is provided with a reduced neck portion 27 substantially as shown in FIG. 1. Such containers 26 may be formed of glass, plastic, or other suitable material in which a granulated or powdered material, such as sugar, instant coffee and the like, is packaged for retail distribution and which is required to be served in relatively small predetermined or needed amounts. Such containers 26 are also usually provided with an external thread 28 about the neck opening thereof for receiving a screw threaded cap 29 to seal the same. In accordance with this invention an improved dispensing means 25 is provided for use with such containers 26 to dispense therefrom substantially equal predetermined amounts of the granular material contained therein upon each dispensing operation.

In the form of the invention disclosed in FIGS. 1 to 4, the dispensing means 25 comprises a dispenser top 30 which is adapted to span the mouth opening of the container 26, so that the marginal portion 30A thereof rests on the lip of the container 26. A means is connected to the undersurface of the top 30 to define therewith a helical like chamber 31 having means defining an angularly disposed inlet and outlet 32 and 33 therefor respectively. In the illustrated form of the invention, the chamber 31 is defined by a circumscribing end wall 34 which is dependently connected to the undersurface of the dispenser top 30. Accordingly, the side wall 34 is adapted to be received within the neck opening of the container 26. Connected to the end or side wall 34 is a bottom wall 35 to define a chamber 31. Connected between the top and bottom walls 30, 35 of the dispenser is a partition 36. Accordingly, the partition 36 extends radially inwardly so that the free end 36A thereof is spaced from one side of the dispenser. As shown the chamber is provided with a discharge opening 33 disposed in the plane of the dispenser top. The inlet 32 of the chamber 31 is defined by an opening formed in the bottom surface 31 thereof. Accordingly, a partition or wall member 36 is disposed so that the inlet and outlet openings 32, 33 are disposed on opposite sides thereof and adjacent thereto. The bottom wall portion 35A of the dispenser adjacent the discharge opening 33 thereof is sloped so as to define an inclined surface for directing the fluid material disposed within the chamber 31 to the discharge opening thereof as the dispenser top is rotated as will be hereinafter described. Accordingly, it is to be noted that the inlet and outlet 32, 33 to the dispensing chamber 31 so formed are angularly disposed and that the chamber is thus opened at the respective ends, the inlet end thereof being in communication with the interior of the jar. The construction of the dispenser top thus described defines a substantially helical like or shaped chamber extending from inlet to outlet 32 and 33 respectively.

The dispenser top thus described is adapted to be received within the neck opening of the jar so that the top portion 30 is substantially flush with the upper end of the container. Thus, the arrangement is such that the conventional screw thread closure C may be readily threaded upon the external threads 28 of the neck opening.

Thus, a feature of this invention resides in the provision in that the dispensing unit 25 can be readily adapted to a conventional jar or container construction in a manner that a conventional screw closure 29 may be utilized in conjunction therewith.

In accordance with this invention, means are provided for rotatably securing the dispenser unit 25 described within the neck opening of the jar. In the form of the invention shown in FIGS. 1 to 4, this is accomplished by providing the lower portion of the dispensing unit with a plurality of circumferentially spaced laterally extending retaining means in the form of projections or ears 38 which are adapted to extend beneath the inside curvature 39 of the container defined in the neck portion thereof. The retaining ears 38 may be formed of a suitable plastic material which is rendered sufficiently flexible to permit the dispensing unit 25 to be readily inserted through the neck opening of the jar and whereby the retaining means or lug 38 are readily flexed so that they will engage the under curvature 39 of the neck and positively retain the dispensing unit within the neck opening of the container and, at the same time, render the dispensing unit readily rotatable with respect to the neck opening of the container. It will thus be apparent that in operation the dispensing unit 25 can be dialed or rendered rotatable with respect to the container 26 to facilitate the dispensing of the fluent material in the container. As shown, the top 30 of the dispensing unit may be provided with a shallow recess 40 to provide a finger hold by which the dispenser unit 25 may be rotated relative to the jar.

If desired, the discharge opening 33 of the dispensing unit 25 may be suitably sealed by an adhesive backed strip of material 42. Consequently, such a seal 42 will maintain the freshness and the aroma of the material in the container, e.g. instant coffee and the like. As an alternate construction, as shown in FIGS. 5 to 7, the discharge opening 44 may be defined by an easy tear or pull tab 45 defined by suitable score lines.

With the construction described, it therefore becomes apparent that the dispensing unit 25 is constructed and arranged so as to define a substantially helical like chamber 31 that is provided with an inlet opening 32 in communication with the interior of the container 26 and a discharge opening 33 angularly disposed relative thereto.

In operation, the container 26 containing a supply of flowable material, e.g. instant coffee, sugar and the like, which is desired to be dispensed in equal predetermined amounts as required is tilted so that the top end thereof is directed downwardly so as to permit the granular or powdered material in the container to flow downwardly to flood the inlet 32 of the chamber 31 defined by the dispensing unit. To effectively pour substantially equal predetermined amounts of material upon each dispensing operation from the container 26, the container preferably held with its longitudinal axis disposed somewhere in the zone between 30 to 75° with respect to a horizontal plane. With the container thus inverted or tilted into pouring position, the dispensing unit 25 is then rotated relative to the jar 26 in a directional rotation in which the material will first be caused to flow into said chamber 31. That is, the dispensing unit is rotated about the selected axis so that the inlet 32 would move circumferentially and upwardly to permit the material of the container to drop into the dispenser by gravity. As the inlet opening 32 reaches the 6 o'clock position or its bottom most position during the relation relative to the container, the material in the container will begin to flow into the helical chamber 31 of the dispenser. As the rotation of the dispensing top relative to the jar continues, the material will continue to drop into the dispenser unit 25 until the inlet reaches its upper or top position substantially 180° spaced from its lowered or bottom position. As the rotation continues beyond this position, no more material can enter into the chamber as the partition 36 functions as a positive cut-off for the material entering the chamber. Thus, the chamber 31 is unable to scoop any more of the material flowing thereinto from the container, and that from then on, the flow of the material becomes gravitational. Accordingly, the measured quantity of material disposed within the unit is delivered out through the discharge opening as the dispensing unit's discharge opening begins its descent. Accordingly, the material will start to flow out of the discharge opening 33 at approximately the 5 o'clock position and will continue to flow until the dispenser has been emptied of its predetermined amount.

In accordance with this invention, it is to be noted by suitably shaping the partition that the cut off point of the amount material which is adapted to be scooped within the chamber 31 upon initial rotation of the dispensing unit 25 relative to the jar can be controlled. In this manner the predetermined amount of material to be dispensed can be regulated for any given dispenser unit.

Essentially, the dispensing unit 25 is a combination of a trapping or scooping chamber with an inlet and outlet openings 32, 33 are angularly disposed so that when the dispenser or chamber 31 defined thereby is rotated relative to the container, the chamber 31 will move in such a manner that a material stored within the container 26 is first caused to drop through the inlet opening 32 and into the channel during the initial 180° of rotation thereof.

The inlet opening 32 is so arranged that upon the completion of the first 180° of rotation, no further material is permitted to drop into the chamber 31 for the next succeeding 180° of rotation. The material thus trapped within the chamber 31 will thus be discharged from the chamber through the outlet opening 33 thereof as rotation of the dispenser unit 25 continues.

Accordingly, the outlet 33 is spaced at an angular distance from the inlet 32 a predetermined amount so that gravity flow of material out through the chamber 31 begins shortly after the completion of the intake to the chamber 31. It will be apparent that the dispenser unit 25 thus described will not function for a liquid. This is because there would be an uninterrupted flow of the liquid through the dispenser whenever the liquid level within the container was higher than the level of the discharge delivery opening. In the case of a container full of liquid, there would be an outflow whenever the container would be tilted even slightly of the vertical.

FIGS. 5, 6 and 7 illustrate a slightly modified form of the invention. In this form of the invention, the dispensing unit 50 is substantially similar in all respects to that hereinbefore described with reference to FIGS. 1 to 4 with the exception of the means whereby the unit 50 is rendered rotatably journalled to the neck opening 51 of a container 52. In this form of the invention, a container structure 52 is differed slightly. As shown, the neck opening 51 of the container is circumscribed by an outwardly projecting annular bead 53 disposed adjacent the upper end thereof. Accordingly, the external threads 54 of the neck opening for the closure are spaced at a distance below the bead 53 of the jar.

In this arrangement, the dispensing unit 50 is provided with a top member 55 which is provided with a circumferential marginal or flange portion 56 which is adapted to encircle or embrace the bead 53 of the neck opening, and in this manner, the dispensing unit 50 is rotatably secured to the upper end of the jar opening.

In this form of the invention, the discharge opening 44 is defined by an easy tear flap 45 which can be readily removed when the dispensing unit 50 is placed in operation. As shown, a pull tab 45A is connected to the easy tear flap 45 to facilitate the removal thereof. Thus, in this form of the invention, it is to be noted that a slightly modified cap structure 57 can be readily threaded over the dispensing unit 50 disposed within the neck opening of the container 52.

In operation, the structure of FIGS. 5 through 7 is identical with that hereinbefore described, and therefore, a further description thereof is not considered to be essential for an understanding of the instant invention.

FIGS. 8 through 12 illustrate a further modification of the instant invention. In this form of the invention, it is adapted to be utilized in conjunction with a standard can construction 60 in which powder materials such as coffee or the like are retailed. Such material when used are required to be metered or measured in prescribed amounts.

In accordance with this invention, a novel dispenser unit 61 may be constructed and arranged so as to be utilized in conjunction with such can structure 60 whereupon predetermined, substantially equal, metered amounts of granular material may be poured directly from the can 60. As shown in FIGS. 8, 9 and 10, the dispensing unit 61 comprises simply of a circular top 62 which is adapted to span the top 60A of the conventional can structure 60, and which circular top 62 is provided with a depending flange or side wall portion 63 by which it is adapted to frictionally engage the side wall of the can structure 60. Accordingly, such a top 62 is rendered readily rotatable with respect to the can. As shown in FIG. 8, the top 60A of the can 60 is usually slightly concaved or recessed below the beaded portion 60B thereof. Therefore, as shown in FIG. 8, a major portion of the top 62 is spaced from the top 60A of the can to define therebetween a measuring chamber 64.

As best seen in FIGS. 9 through 12, the dispenser top 62 is provided with a wedge shaped recessed portion 65, the bottom 66 of which is adapted to engage the top 60A of the can. Accordingly, the recessed portion 65 is defined by vertical partitions 65A, 65B.

Adjacent the recessed portion 65, the top 62 and a portion of one partition 65A is provided with a cut-out portion to define an outlet opening 67 for the chamber 64. In use, it is contemplated that each can be provided with dispenser top as described.

Thus, to dispense the content of such can, the can is required to be first punctured with a suitable opening means to form an opening 68. In the illustrated invention, as seen in FIGS. 9 and 10, the opening 68 in the can top is defined as a wedge shaped opening. The arrangement is such that the opening 68 in the can is made smaller in the bottom wall area of the recessed portion 66 of the top. Thus, in the inoperative position of the dispensing unit in this form of the invention, the bottom 66 of the recessed top is positioned so that it overlies and lies flush against the upper 60A end of the can, and thus defines a closure for the can opening 68.

To dispense the contents of the can, in equal predetermined measured amounts, the dispensing top 61 thus described is rotated in a counter clockwise direction as viewed in FIGS. 9 and 10 an amount sufficient for the bottom 66 of the recessed portion 65 to uncover the opening 68 formed in the can. Thus, the opening 68 of the can 60 is now placed in communication with the space 64 defined between the top of the can 60A and the top 62 of the dispenser 61 placed thereover. Therefore, to dispense the material in equal predetermined amounts, the can 60 is simply inverted and held at an angle off the vertical sufficient to permit the powdered material therein to flood through the opening 68 formed therein, and to flow into the chamber or space 64 defined between the top of the can and the dispensing unit. Consequently, upon rotation of the container and dispensing top 62 connected thereto in a counterclockwise direction, the material flooding into the chamber deferred between the can and the dispenser top will be discharged through the outlet opening 67 of the dispenser top in a manner similar to that described in my co-pending application, No. 106,-410 filed April 28, 1961, now Patent No. 3,137,418. Therefore, upon the dispensing of the desired predetermined amounts of material from the can 60, the can opening 68 is readily sealed by returning the bottom 66 of the recessed portion 65 of the top 62 to a position overlying the opening 68 of the can. Thus the dispensing top 62 functions as a seal for the can opening to maintain the freshness and aroma of the contents contained therein.

An important feature resides in the provision that the vertical partition 65B or side wall of the recess portion extends inwardly beyond the ends of the discharge opening 67 and thus functions as a positive cut-off of the material entering the chamber.

Also it is to be noted that by varying the angular displacement of the top 62 relative to the opening 68 in the can top that the volume or amount of measured material dispensed can be adjusted or varied. If desired, suitable indexing means may be provided to position the top 62 relative to the can 60 so that the metered amount desired can be determined.

FIGURE 13 illustrates a modified form of the invention from that described with reference to FIGS. 8 through 12. In this form of the invention, the predetermined amounts of material to be dispensed can be adjusted by vertical adjustment of the dispenser top 70 relative to the can 71. This is readily accomplished by providing the dispensing top 70 similar in all respects to that described with reference to FIGS. 9 through 11 except that a relatively wide or deeper depending side wall portion 72 is provided and that the can and depending wall portions have cooperating interlocking means 74 whereby the top 70 of the dispenser can be vertically adjusted and maintained with respect to the top 71A of the can 70. In this manner, the chamber 75 defined between the top 71A of the can and the top 70 of the dispenser unit can be adjusted so as to control the volumetric capacity thereof.

In the illustrated form of the invention, the interlocking means 75 are formed by cooperating angular grooves 74A and beads 74B formed respectively in the body of the can 71 and the internal surface of the depending side walls 72. In this manner, the top 70 can be readily positioned vertically with respect to the can 71 so as to change the volumetric capacity of the space 75. Such volumetric capacities, for example, may in the lowermost adjusted measure an amount, equivalent to one tablespoon, and in a second or high position, measure an amount the equivalent of say two tablespoons or the like. Thus, by determining the number of settings, various volumetric amounts of the material can be provided for, and the dispensing operation performed in the manner hereinbefore described with reference to FIGS. 9 through 12. Thus in this form of the invention, the volumetric capacity of the chamber can be varied by compound adjustment of the dispenser vertically and angularly with respect to the can.

FIGS. 14 to 18 illustrate still another form of the invention. In this form of the invention, the dispensing unit 80 comprises a top 81 which is constructed to conform substantially to the shape of the can top 82. Thus this form is not provided with a recess portion as described with reference to FIGS. 8 to 13. The dispenser top 81 is circumscribed by a depending side wall 83 adapted to embrace the sidewalls of the can. As best shown in FIG. 15, the top 81 has connected thereto a partition 84 that extends inwardly of the top. As shown in FIG. 16, the side wall 83 of the top 81 are made slightly deeper than the partition 84 so that the dispenser 80 can be readily attached to the can 85 before it has been punctured or formed with its discharge opening 86. To prohibit unintentional removal of the dispenser 80 from the can 85, the depending wall portion 83 may be provided with an inturned flange or bead 83A to engage the bead 85A of the can 85. As shown in FIGS. 15, 17 and 18, the top 81 is provided with an opening 87 through which the material is discharged from the chamber 88 as will be herein described. Accordingly, it will be noted that the barrier or partition 84 extends inwardly of the top 81 beyond the end of the opening 87.

To operate the dispenser top 81 of FIGS. 15 to 18, the can top 82 must be punctured to define the discharge hole 86 therein. In accordance with this form of the invention, the hole 86 must be formed with an extended cut-out portion 86A for accommodating the extended end of the partition 84. The arrangement is such that with the hole 86 shaped as described, the top 81 is positioned so that the partition 84 is disposed directly over the hole 86 so that it may be readily received therein when the top 81 is pressed flush against the top 82 of the can 85. Thus as seen by the solid line drawing of FIG. 14, the top 81 of the dispenser 80 functions as a seat for the can hole 86 in the inoperative position of the can.

To dispense the content of the can in equal predetermined amounts, the dispenser top 81 need only be raised to a desired adjusted position. Accordingly, a space or chamber 88 is defined between the dispenser top 81 and the can top 82 with the barrier or partition 84 dividing the chamber 88 into an intake portion and a discharge portion. Thus with the dispenser top 81 properly adjusted vertically for the desired volumetric setting, the can 85 is tilted or inverted until the contents thereof floods out through the can puncture 86 to fill the chamber 88. Thus rotation of the can 85 and connected top 81 in a given direction, as hereinbefore described, will permit a predetermined portion of the can contents to flow into the chamber 88. As the discharge opening 87 in the top 81 approaches the five o'clock position approximately the barrier 84 will prohibit further flow of the material in the chamber 88 and the measured material in the chamber 88 will begin to flow out therefrom through the opening 87. Upon completion of the dispensing operation, the can puncture 86 can be sealed by depressing the dispenser top 81 toward the can top 82 so that the former is made flush with the top 82 of the can.

With this form of the invention, it will be noted that angular rotation of the dispenser top 81 is prohibited as the barrier 84 received in the can puncture will prohibit relative angular rotation therebetween. Thus the volumetric capacity of the chamber can be determined only by vertical adjustment of the dispenser top 81.

If desired, suitable index means may be provided on either the can 85 or the dispenser top 80 so that the volumetric volume in a given relative adjusted position of the dispenser top can be determined with certainty. For instance, scribe marks 90 arranged to line up with the top of the can may be placed on the side wall 83 of the dispenser top to indicate the number of unit measures to be dispensed by such setting.

While the instant invention has been described with reference to particular embodiments thereof, it will be readily understood and appreciated that variations and modifications may be made without departing from the spirit or scope of the instant invention.

What is claimed is:

1. In combination, a container having a mouth opening and adapted to contain a supply of flowable material and a dispensing means for said mouth opening for dispensing substantially equal predetermined amounts of said flowable material from said container on each dispensing operation, said dispensing means comprising a top rotatably journalled relative to said container, means defining a discharge opening in said top, means connected to said top defining a helical chamber disposed in communication with said discharge opening, and means defining an inlet communicating the interior of said container with said chamber so that when the container is positioned with the chamber downward to permit the contained material to flow downward to cover said inlet so that rotation of the top and connected chamber relative to said container will cause a predetermined amount of said material to flow into said chamber by gravity, and whereupon further rotation of said top without uprighting the container will positively cut off the flow of said material to said chamber while permitting the material in said chamber to be discharged therefrom through said discharge opening in said top, wherein said top is flush with the plane of the mouth opening of said container.

2. In combination, a container having a mouth opening and adapted to contain a supply of flowable material and a dispensing means for said mouth opening for dispensing substantially equal predetermined amounts of said flowable material from said container on each dispensing operation, said dispensing means comprising a top rotatably journalled relative to said container, means defining a discharge opening in said top, means connected to said top defining a helical chamber disposed in communication with said discharge opening, and means defining an inlet communicating the interior of said container with said chamber so that when the container is positioned with the chamber downward to permit the contained material to flow downward to cover said inlet so that rotation of the top and connected chamber relative to said container will cause a predetermined amount of said material to flow into said chamber by gravity, and whereupon further rotation of said top without uprighting the container will positively cut off the flow of said material to said chamber while permitting the material in said chamber to be discharged therefrom through said discharge opening in said top, and including means for positively retaining said chamber forming means in the mouth opening of a container for relative rotation relative thereof.

3. The invention as defined in claim 2 wherein said retaining means comprises projection extending radially outwardly adjacent the bottom of said chamber.

4. The invention as defined in claim 2 wherein said retaining means includes a bead circumscribing the opening of said container, and said chamber forming means including a top having its peripheral portion crimped over said bead whereby said chamber means is rendered rotatably journalled relative to said container.

5. The invention as defined in claim 4 wherein said outlet of said chamber is defined by an easy tear tab.

6. In a dispenser having an opening, the improvement of means for dispensing substantially equally predetermined amounts of granular material stored in said container on each dispensing operation, said means comprising a top rotatably connected to said container about said opening for rotation relative to said container, said top having a discharge opening formed therein, means defining a helical like chamber connected to said top to form a passageway sized to provide for an unrestricted flow of material therethrough and communicating with said discharge opening, means defining an inlet opening annularly disposed with respect to said discharge opening communicating the interior of said container to said chamber, said inlet and outlet openings being sufficiently large to permit the free flow of said material therethrough, and said inlet opening being angularly disposed out of the plane of said discharge opening, a material cut off means disposed within said chamber between said inlet and discharge openings of said chamber so that in a tilted position of the container said chamber is first filled upon the rotation of said top and said connected chamber relative to said container through a given angular distance with a predetermined amount of material and whereupon rotation of said top relative to said container without uprighting the container, said material cut off means positively cutting off the flow of material through the chamber while permitting the predetermined amount of material in said chamber to flow out therefrom by gravity for effecting the dispensing of said predetermined quantity of material from said chamber on each revolution of the top relative to said container.

7. A dispenser having an opening for dispensing substantially equally predetermined amounts of granular material on each dispensing operation from a container in which said granulated material is stored, said dispenser comprising a top adapted to span the opening of the container, said top having a discharge opening formed therein, means defining a helical-like chamber forming a passageway sized to provide for an unrestricted flow of material therethrough communicating with said discharge opening and having an inlet opening annularly disposed with respect to said discharge opening, said inlet and outlet openings being sufficiently large to permit the free flow of said material therethrough, and said inlet opening being angularly disposed out of the plane of said discharge opening, a material cut off means disposed within said chamber between said inlet and outlet openings thereof so that in a tilted position of the container said chamber is first filled upon the rotation of said top relative to said container through a given angular distance with a predetermined amount of material and whereupon rotation of said top relative to said container without uprighting the container, said material cut off means positively cuts off the flow of material through the chamber while permitting the predetermined amount of material in the chamber to flow out therefrom by gravity for effecting the dispensing of said predetermined quantity of material from said chamber on each revolution of the dispenser.

8. In combination, a container adapted to contain a supply of flowable material, said container having an opening in the top thereof, and a dispensing means cooperatively associated with the opening, said dispensing means being rotatable relative to said container in order to effect the dispensing of predetermined amounts of material therefrom wherein said dispensing means is vertically adjustable with respect to said container to vary the amount of material dispensed therefrom and wherein the dispensing means is angularly adjustable with respect to said container to vary the amount of material dispensed therefrom.

9. In combination with a can having an opening adapted to be formed in the upper end thereof, a dispensing means for dispensing substantially equal predetermined amounts of flowable material therefrom, said dispensing means comprising a dispenser top adapted to span the top of said can, a circumscribed depending side wall connected to said dispenser top, said side wall being adapted to frictionally secure said dispenser top for movement relative to said can, said dispenser top and can top defining therebetween a chamber, said dispenser top having an inwardly extending recessed portion having a bottom which is adapted to engage the top of said can, said recessed portion being angularly disposed by the rotation of said dispenser top relative to said can top to open and close the opening in said can, and said dispenser top having a discharge opening formed therein for communicating with said chamber whereby in the rotated position of said dispenser top to open said can opening, said discharge opening is angularly disposed with respect to said can opening so that in the tilted position of the can said chamber is first filled upon rotation of the top through a given angular distance with a predetermined amount of material and whereupon further rotation of the can without uprighting the can the flow of material into said chamber is positively cut off while permitting the predetermined amount of material in the chamber to flow out therefrom by gravity for effecting the dispensing of said predetermined quantity of material from said chamber on each revolution of the can.

10. The invention as defined in claim 9 whereby the volume of said chamber can be varied by angular rotation of said dispenser top relative to said can top.

11. In combination with a container having an opening adapted to be formed in the upper end thereof, a dispensing means for dispensing substantially equal predetermined amounts of flowable material therefrom, said dispensing means comprising a dispenser top adapted to span the top of said container, a circumscribing depending said wall connected to said dispenser top, said side wall being adapted to frictionally secure said dispenser top for movement relative to said can, said dispenser top and can top defining therebetween a chamber, a partition disposed between said dispenser top and said container top and extending part way thereacross to define a barrier, said dispenser top having a portion thereof adapted to form a closure for said opening in said container and said dispenser top having a discharge opening formed therein for communicating with said chamber, said discharge opening and opening in said container being disposed on opposite sides of said barrier, whereby in the rotated position of said dispenser top in the open position of said container opening, said dispenser discharge opening is angularly disposed with respect to said container opening so that in the tilted position of the container said chamber is first filled upon rotation of the top through a given angular distance with a predetermined amount of material and whereupon further rotation of the can without uprighting the can the flow of material into said chamber is positively cut off while permitting the predetermined amount of material in the chamber to flow out therefrom by gravity for effecting the dispensing of said predetermined quantity of material from said chamber on each revolution of the can.

12. The invention as defined in claim 11 wherein said partition is adapted to be received in the opening of said container to render said dispenser vertically adjustable relative to said container top to open and close said container opening and to vary the volume of said chamber.

13. For use in combination with a container having a top adapted to be punctured to define an opening through which a flowable material contained therein is dispensed, the improvement of a dispensing means for dispensing therefrom substantially equal predetermined amounts of said material on each dispensing operation comprising, (a) a dispenser including a top adapted to cover the top of said container, said dispenser top being spaced from said container top in the operative position of said dispenser to define a chamber therebetween, (b) a partition extending radially inwardly a predetermined distance between said dispenser top and said container top, (c) and an outlet opening formed in said dispenser top to define an outlet for said chamber whereby in the operative position of said dispenser the outlet opening in the dispenser top and the discharge opening in the container top are disposed on opposite sides of the partition whereby in the tilted position of said container said chamber is first filled upon rotation of the top through a given angular distance with a predetermined amount of material and whereupon further rotation of the top without uprighting the container said material flowing thereinto is positively cut off while permitting the predetermined amount of material in said chamber to flow out therefrom by gravity through said outlet opening.

14. The invention as defined in claim 13 and including means connected to said dispenser top for defining a closure for the opening in the top of the container whereby said opening in the container top can be opened and closed by limited angular rotation of said dispenser top.

15. The invention as defined in claim 13 whereby the predetermined amount of material dispensed can be readily varied by varying the angular distance of the partition relative to the opening in said container top.

16. The invention as defined in claim 13 wherein said partition is adapted to be received in the opening of said container top so that said container top opening is opened and closed by vertical displacement of said dispenser top relative to said container top.

17. The invention as defined in claim 16 including indexing means for positioning said dispenser top relative to said container top for indicating the volume of the predetermined measure of said material to be dispensed therefrom.

18. For use in combination with a container having a top adapted to be punctured to define an opening through which a flowable material contained therein is dispensed, the improvement of a dispensing means for dispensing therefrom substantially equal predetermined amounts of said material on each dispensing operation comprising, (a) a dispenser including a top adapted to cover the top of said container and a connected depending side wall adapted to embrace a container, said dispenser top being spaced from said container top in the operative position of said dispenser to define a chamber therebetween, (b) a partition extending radially inwardly a predetermined distance between said dispenser top and said container top, (c) and an outlet opening formed in said dispenser top to define an outlet for said chamber whereby in the operative position of said dispenser the outlet opening in the dispenser top and the discharge opening in the container top are disposed on opposite sides of the partition whereby in the tilted position of said container said chamber is first filled upon rotation of the top through a given angular distance with a predetermined amount of material and whereupon further rotation of the top without uprighting the container said material flowing thereinto is positively cut off while permitting the predetermined amount of material in said chamber to flow out therefrom by gravity through said outlet opening.

19. The invention as defined in claim 17 whereby said partition is adapted to be received in said container opening.

20. The invention as defined in claim 19 wherein the opening in said container is provided with a slot extending inwardly of said container, and said partition having a portion adapted to be received in said extended slot.

21. In combination with a container having an open end, a dispenser for dispensing substantially equal predetermined amounts of flowable material therefrom in the tilted position thereof, said dispenser comprising, (a) a top adapted to span said opening,
(b) means defining a helical like chamber connected to said top,
(c) means for rotatably securing said top and said connected chamber to the open end of said container whereby said top is free to rotate relative to said container,
(d) means defining a discharge opening formed in said top in communication with said chamber,
(e) means defining an inlet to said chamber disposed in communication with said chamber,
(f) a partition means interposed between said inlet and discharge opening, said partition means extending radially inwardly of said chamber to function as a positive cut-off for the flow of material through said chamber so that in the tilted position of said container rotation of the dispenser relative to said container causes said chamber to be first filled with a predetermined amount of material, and whereupon further rotation of the dispenser relative to the container without uprighting the container renders said partition effective to positively cut off the flow of material through said chamber while permitting the predetermined amount of material in the chamber to flow out therefrom by gravity for effecting the dispensing of said predetermined quantity of material from said chamber on each revolution of the dispenser relative to said container.

References Cited by the Examiner

UNITED STATES PATENTS

| | | | |
|---|---|---|---|
| 604,492 | 5/1898 | Fergusson | 222—367 |
| 2,190,092 | 2/1940 | Bailey | 222—456 X |
| 2,631,763 | 3/1953 | Sutton | 222—425 |
| 2,682,357 | 6/1954 | Bogossian | 222—440 X |
| 2,765,956 | 10/1956 | Schmidtke | 222—456 X |
| 2,815,154 | 12/1957 | Smith | 222—452 |
| 2,941,701 | 6/1960 | Steiwing et al. | 222—452 X |
| 3,029,002 | 4/1962 | Gregoire | 222—307 |

M. HENSON WOOD, JR., *Primary Examiner.*

LOUIS J. DEMBO, *Examiner.*

ALLEN N. KNOWLES, *Assistant Examiner.*